(No Model.)

J. W. LYON.
METAL SCREW MACHINE.

No. 276,438. Patented Apr. 24, 1883.

Witnesses-
Jnos. Buckler,
F. W. Hanaford.

James W. Lyon,
Inventor.
By Worth Osgood,
Attorney.

UNITED STATES PATENT OFFICE.

JAMES W. LYON, OF BROOKLYN, NEW YORK.

METAL-SCREW MACHINE.

SPECIFICATION forming part of Letters Patent No. 276,438, dated April 24, 1883.

Application filed May 18, 1882. (No model.)

*To all whom it may concern:*

Be it known that I, JAMES W. LYON, of Brooklyn, county of Kings, and State of New York, have invented certain new and useful Improvements in Metal-Screw Machines, of which the following is a full, clear, and exact description, reference being had to the accompanying drawings, and to the letters of reference marked thereon.

My invention has relation to that class of screw-cutting machines wherein the wire or rod is fed along through a hollow revolving spindle to the position in which the screw or screw-blank is to be formed, there to be acted upon by the cutters or forming-tools, the finished screw or blank cut off, and the rod again advanced for the formation of another screw or blank, and so on. Of this class of machines, now well known, there are various styles.

The object of my invention is to produce a simple, compact, durable, and easily-operating machine in which the cutting and forming tools will be firmly and accurately held in place, and be capable of being changed or brought to bear upon the work rapidly and with certainty, and in which the rod may be quickly and easily gripped at the proper time, and this by mechanism calculated and arranged to effect a considerable saving in the time of the operator over and above former styles of machines, as well as to produce a superior class of work.

To accomplish this my improvements involve the application, in connection with the movable turret or tool-holder, of a hinged and spring-actuated slide-rest and a convenient and efficient arrangement of lever for gripping the blank, all of which will be herein first fully described, and then pointed out in the claims.

Figure 1:
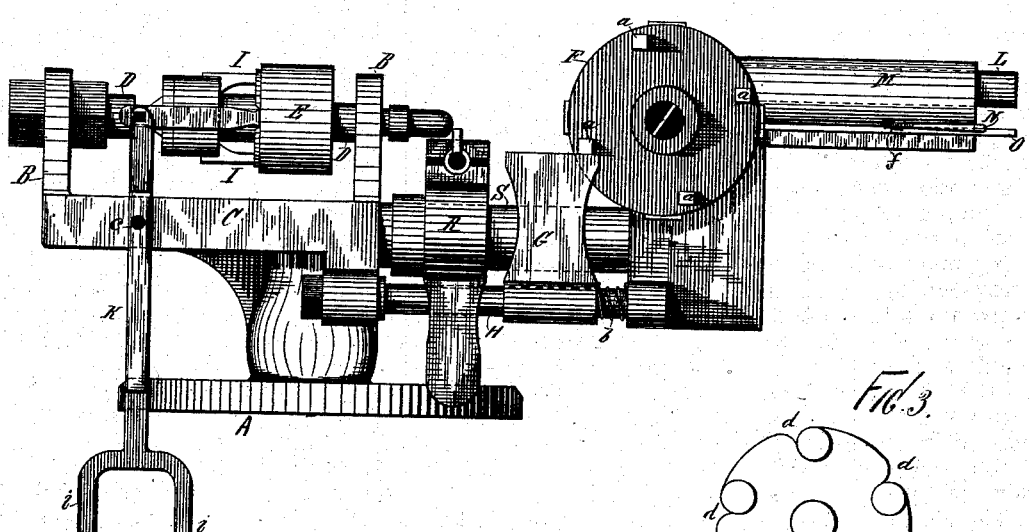
Figure 3:
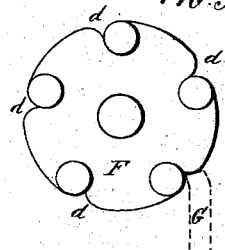
Figure 2:
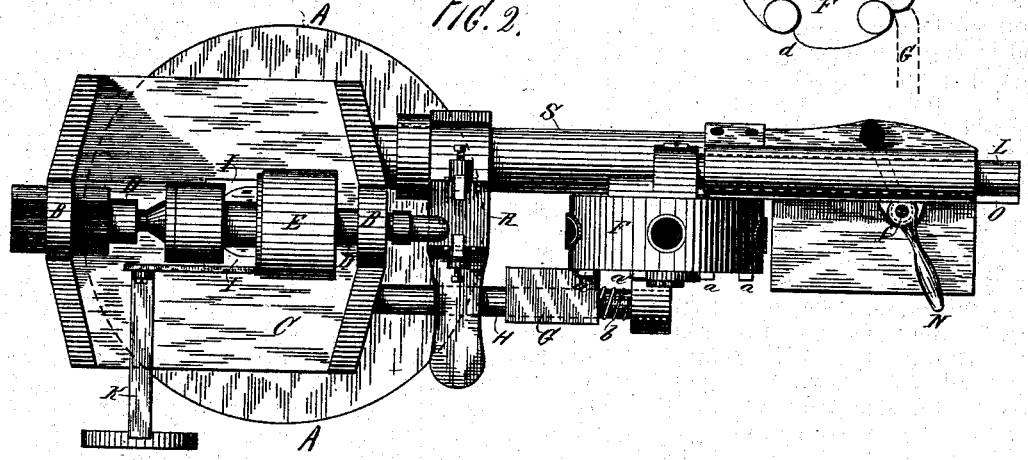

In the accompanying drawings, forming part of this specification, Figure 1 is a side elevation, and Fig. 2 a plan view, of a machine constructed and arranged in accordance with my improvements. Fig. 3 is a front elevation of a modified form of turret or tool-holder intended to be employed in connection with the hinged detaining slide-rest when desired.

In all these figures like letters of reference, wherever they occur, indicate corresponding parts.

A is the base of the machine, intended to be secured to the bench or other foundation, and to support the superstructure. It may be of any form.

B B are two arms rising from the bed-plate C, in which the boxes for the hollow revolving spindle are located.

D is the hollow spindle, driven by the pulley E, or by equivalent means, through which spindle the rod or wire is advanced as required for forming the screw or screw-blanks.

F is the movable turret, intended to hold tools to operate successively on the screw-rod. These may be of any number and character desired, and may be secured in their places by any of the well-known means. As shown in Figs. 1 and 2, the axis of this turret crosses the prolongation of the axis of the revolving spindle at right angles, being preferably a little higher than the spindle-axis, and the tools are intended to project radially from the turret, the effect of which is to direct the working-thrust upon the tools toward the axis of the turret, whereby the tools are held to best advantage, and little liable to be crowded out of line. The turret is revolved about its axis by the application of the hand, so as to bring the desired tool into position for work. To hold the turret firmly in place, after having been adjusted, it is provided with a number of stop lugs or detents, *a a*, (corresponding with the number of tools held,) and each lug so arranged that when it is brought to bear upon the upper face of the slide-rest the corresponding tool will be located in its proper position for work.

G is the slide-rest. It is hinged at or near its base, as upon the rod H, and provided with a spring, *b*, for returning it to its normal position after having been moved. When the turret is turned the lugs *a* (coming up past the under side of the hinged slide-rest) move the rest back far enough to allow the lugs to pass, and as soon as one passes the spring *b* returns the slide-rest to place. If, then, the lug be allowed to rest upon the upper face of the slide-rest, the turret will be firmly sustained until again moved by hand. Instead of the particular spring *b*, I may employ any other form of returning-spring, or an equivalent weight, if desired; but some kind of spring is regarded as best. By employment of the hinged slide-rest for stopping and holding the turret the latter may be quickly adjusted, and if it be, for any reason, required to revolve the turret in the opposite direction, it is only necessary to hold back the slide-rest with the hand, when the turning may be easily effected, and the slide-rest will automatically return to its proper place when released. The slide-rest may be provided with a projecting handle.

The clutch I, for grasping or gripping the wire or rod for the purpose of connecting it with the hollow spindle, may be of any approved pattern. Heretofore the clutch has been operated by hand, consuming time of the operator, and taking his hand from other work in and about the machine. To obviate this I pivot a lever, K, at any suitable point, as $c$, one end of said lever being connected with the clutch and the other extended down a convenient distance, and provided with a convenient form of fork, as $i\ i$. The fork is to accommodate the knee or leg of the operator and enable him to shift the clutch without using his hand therefor. The utility and desirability of this feature or improvement will be readily appreciated by any one accustomed to the use of this class of machines.

The lever R, for holding the separating and finishing tool or tools, is journaled upon the side bar, S, so as to swing or move into proper position when required. In this lever two tools are secured, one on each side of the work. The end of the lever (forming a handle) is always within easy reach of the operator, who has only to grasp and elevate the handle in order to bring one tool into position for work, or depress it to bring the other tool into like position.

The turret-axis is mounted upon a slide-bar, L, neatly fitted to its cylinder M, and is moved back and forth by the hinged lever N, one of the lugs $a$ always bearing upon the top of the slide-rest, so as to prevent turning of the turret around its axis. The lever N engages with a projection upon the separate rod O, as at $f$, connected with the turret-block and not directly with the slide-bar L. The turret-axis might be located in a plane parallel with the axis of the spindle, instead of perpendicular to it, as in Figs. 1 and 2. In such case the tools could be mounted in the face of the turret, as indicated at Fig. 3. The same hinged slide-rest is intended to be employed with the turret so located, undercuttings, as at $d\ d$, being provided in the periphery of the turret, so formed that their upper faces will bear upon the top of the slide-rest to prevent turning, while the opposite portions will admit of the turret being shifted easily and rapidly. Instead of the undercuttings or indentations, lugs might be formed on the periphery of the turret. This turret-axis being located above the spindle-axis, the stop lugs or detents are caused to bear down firmly upon the face of the slide-rest as soon as one of the tools in the turret is brought into contact with the work.

The improvements, constructed, arranged, and adapted to operate substantially in accordance with the foregoing explanations, are found in practice to admirably answer all the purposes and objects of the invention as previously stated.

Having now fully described my invention, what I claim as new, and desire to secure by Letters Patent, is—

1. The combination, with the hinged slide-rest and its returning-spring, of the rotatory turret provided with lugs or detents which bear successively upon the top of the slide-rest, whereby the turret may be rotated, and may be moved in the direction of the axis of the clutch, substantially as described.

2. In a screw-cutting machine, the combination, with the clutch, of the depending forked lever for shifting the same by contact of the knee therewith, constructed and arranged substantially as and for the purposes set forth.

In testimony that I claim the foregoing I have hereunto set my hand in the presence of two witnesses.

JAMES W. LYON.

Witnesses:
F. W. HANAFORD,
WORTH OSGOOD.